Nov. 30, 1937.   J. B. McFERRAN, JR   2,100,549
MOTOR DRIVEN FOOD CHURNING DEVICE
Filed Dec. 1, 1932   3 Sheets-Sheet 1
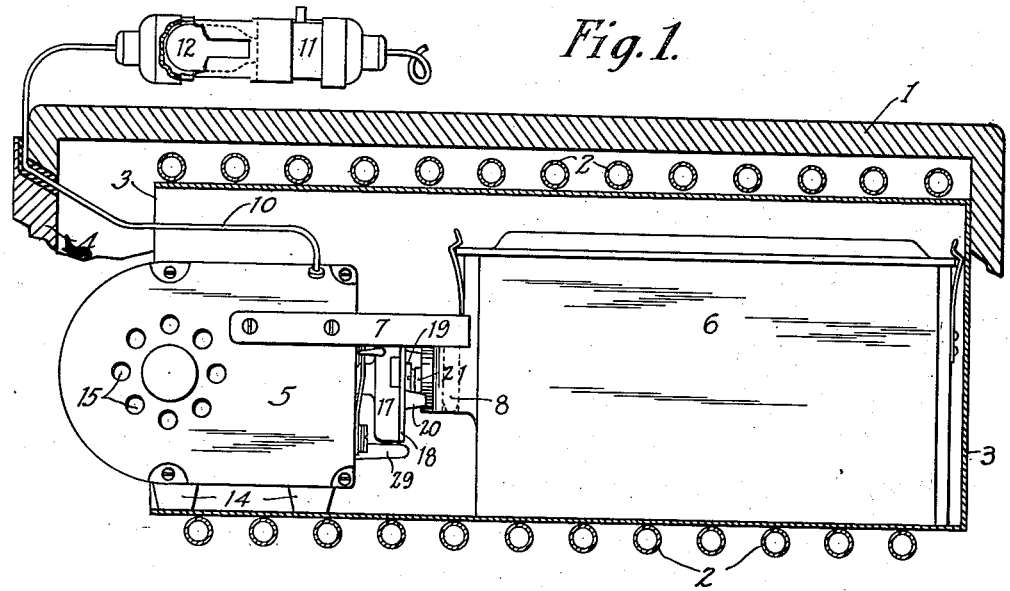
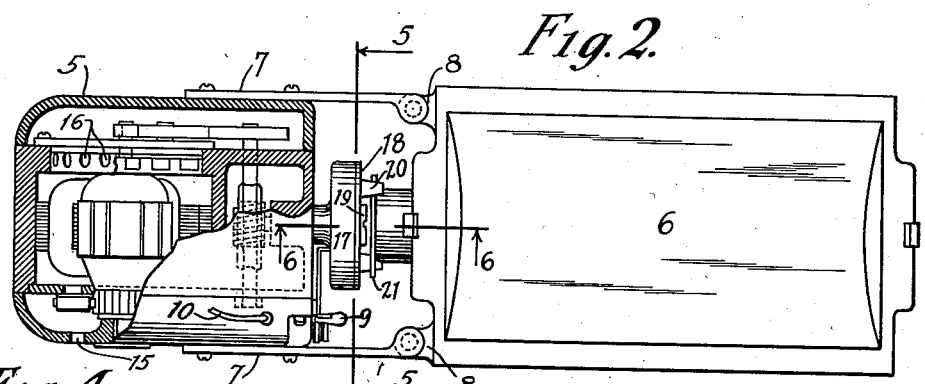
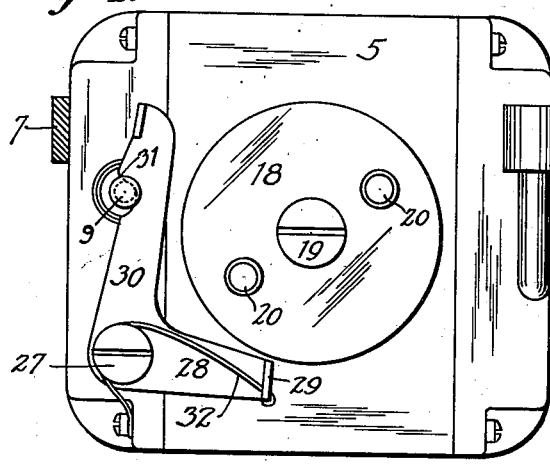
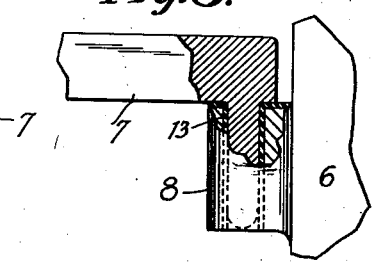
Inventor
John B. McFerran, Jr.
Arthur H. Robert
Attorney Inventor
John B. McFerran, Jr.
Arthur J. Robert
Attorney Nov. 30, 1937.  J. B. McFERRAN, JR  2,100,549
MOTOR DRIVEN FOOD CHURNING DEVICE
Filed Dec. 1, 1932   3 Sheets-Sheet 3
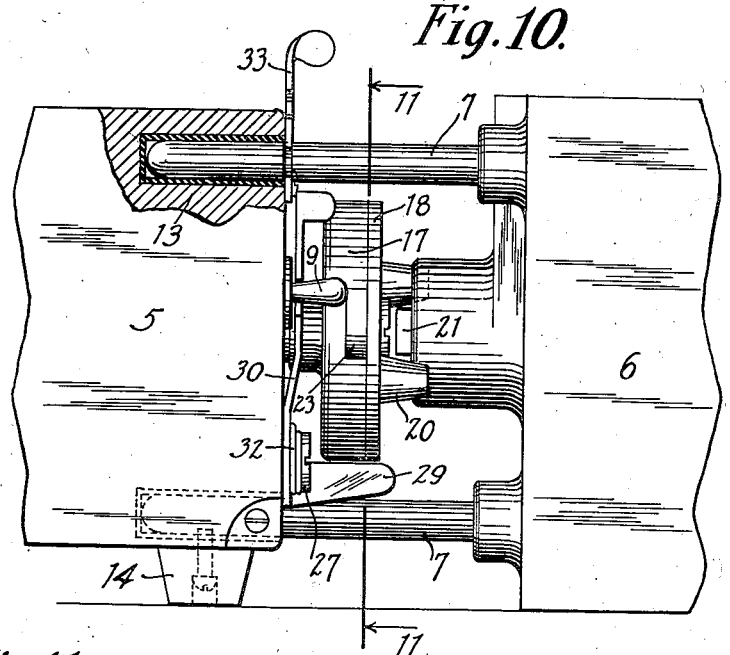
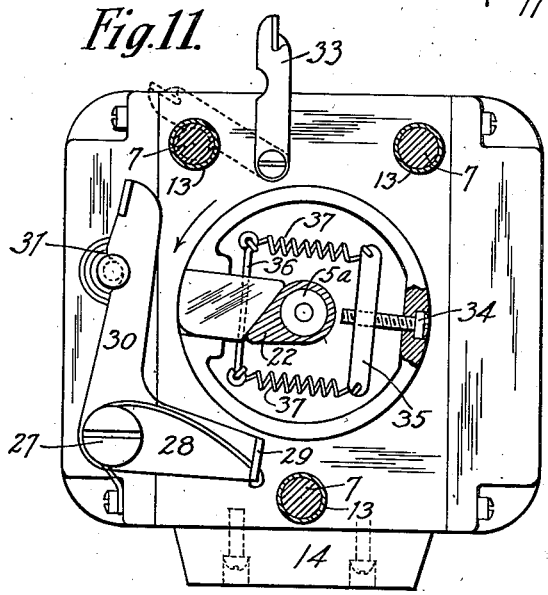
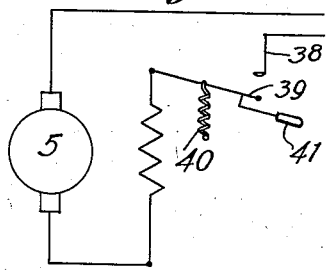
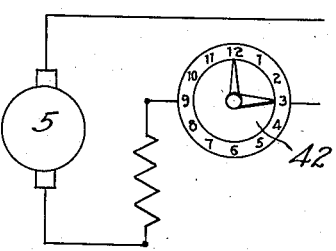
Inventor
John B. McFerran, Jr.
Arthur J. Robert
Attorney Patented Nov. 30, 1937

2,100,549

UNITED STATES PATENT OFFICE 2,100,549

MOTOR DRIVEN FOOD CHURNING DEVICE

John B. McFerran, Jr., Louisville, Ky., assignor to Louisville Electric Manufacturing Co., Louisville, Ky., a corporation of Kentucky Application December 1, 1932, Serial No. 645,153

4 Claims. (Cl. 259—110)

This invention relates to motor-driven food churning devices of the class primarily intended for the churning of ice creams and other similar foods in the freezing compartment of a mechanical refrigerator. The invention is particularly directed to devices of the type in which the motor and churner or mixer are connected together for insertion as a unit into the freezing compartment wherein they are both supported directly on the floor of such compartment. This arrangement is highly desirable because it is compact and easily handled, but heretofore it has had the objection of requiring an unduly long operating period to produce the desired increase in the consistency of the food being churned, and, in some instances, failing entirely to produce such increase, even in foods which otherwise can be readily frozen in the same compartment.

I have discovered that the operating period necessary to produce a desired increase in the consistency of the food being churned can be reduced substantially in a simple and inexpensive manner without disturbing the general relation of the motor and mixer to each other or to the freezing compartment, and such result forms one of the main objects of my invention.

Another important object is to provide a device of this general character or class with means for stopping the movement of the dasher automatically at the end of a period of operation in which the desired degree of churning or stirring may be accomplished.

Another object is to provide a stopping means whose operation is conditioned upon an increase in the consistency or substance of the food being churned as measured by the increase in the load carried by the motor, whereby the operation of the motor will be stopped when the desired consistency is obtained and before the motor is endangered through over-loading.

A further object is to provide a simple form of means by which the motor may be detachably secured to and properly spaced from the mixing vessel and, at the same time, aligned with and automatically connected to the dasher of the vessel.

The invention is illustrated in the accompanying drawings wherein:

Figure 1 is a side elevation of one form of construction made in accordance with my invention and shown in its relation to a portion of a conventional refrigerator;

Figure 2 is a top plan view of the unit partly broken to show certain details of construction;

Figure 3 is a fragmentary view of a construction detail;

Figure 4 is an end elevation of the driving end of the motor with one of the connecting arms 7 broken away;

Figure 5:
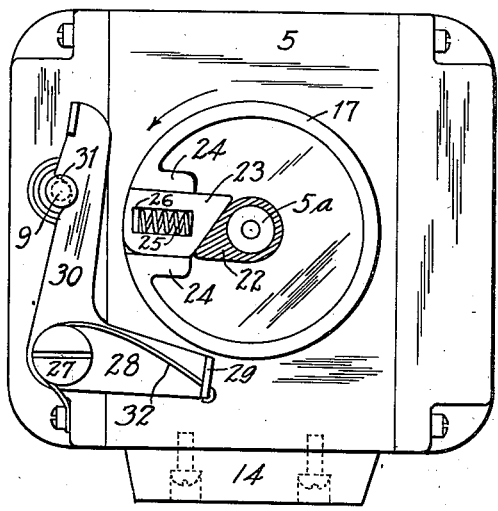
Figure 5 is a section along the line 5—5 of Figure 2 showing the relation of the tripping means during the operation of the motor.
Figure 6:
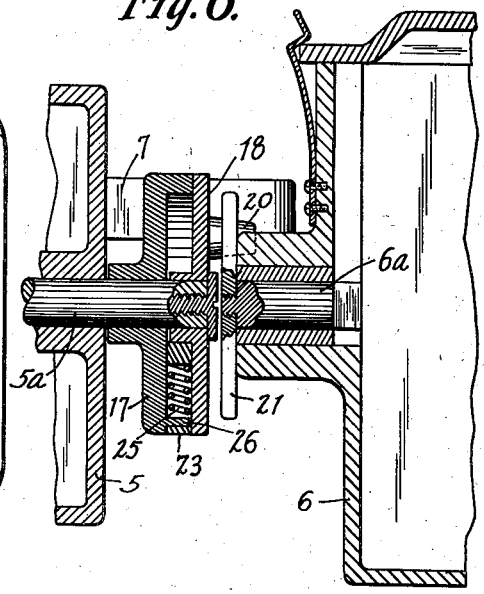
Figure 7:
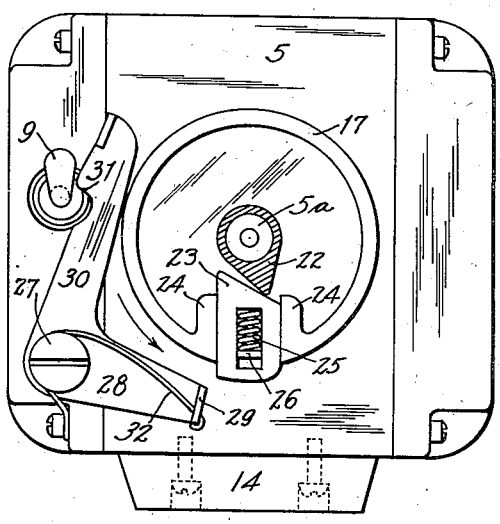
Figure 8:
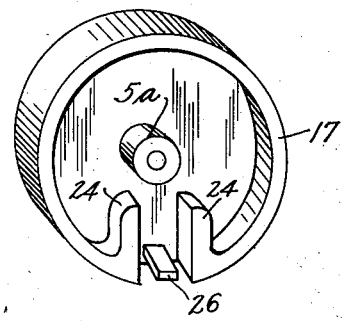
Figure 9:
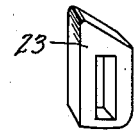

Figure 6 is a section along line 6—6 of Figure 2, but with the dasher bar 21 at right angles to the position shown in Figures 1 and 2, this bar being broken away at its center;

Figure 7 is a view corresponding to Figure 5, but showing the relation of the parts immediately after the tripping operation;

Figure 8 is a perspective showing the interior of the casing 17 in which the tripping element 23 operates, this element being removed for the sake of clearness;

Figure 9 is a perspective view of the tripping element 23;

Figure 10 is a side elevation of a modified form of construction;

Figure 11 is a section along lines 11—11 of Figure 10; and

Figures 12 and 13 are diagrammatic views of alternative arrangements for carrying out the objects of this invention.

Inasmuch as this device is particularly suitable for use in the freezing compartment of a mechanical refrigerator, its relation to a conventional refrigerator is illustrated generally in Figure 1, wherein the refrigerator 1 is shown as having a set of freezing coils 2 surrounding the horizontal freezing compartment 3 which opens toward the door 4. The churning device is horizontally inserted into the compartment 3 with its motor 5 detachably secured to and properly spaced from the mixing vessel 6 by a pair of intervening arms 7 which, at one end, are fixedly secured to opposite sides of the motor casing and, at the opposite end, are down-turned so as to engage in the vertical openings provided by the positioning lugs 8 on the mixing vessel. These arms 7 prevent transverse movement of one part relatively to the other during the operation of the unit and thereby maintain them in proper driving relation. The motor casing contains a trip-switch (not shown) which is controlled by a handle 9 projecting through the driving end of the motor casing, this handle being resiliently urged to the "off" position by a suitable spring (not shown). The motor may be electrically connected to a suitable source of power by a flexible lead line 10 which extends from the trip-switch in the motor casing outwardly through the doorway of the refrigerator, the external portion of this line preferably containing a manually operable control switch 11 for starting and stopping the motor when the handle 9 of the trip-switch is held in the "on" position by the means hereinafter explained. If desired, the trip-switch, lead line 10 and control-switch 11 may contain the electrical connections necessary to set in operation a visible or audible alarm, such as the light 12, when the trip-switch moves to the "off" position, so as to indicate that the motor has stopped, this alarm, of course, being disconnected when the source of power is cut off through switch 11.

Now with the unit inserted into the freezing compartment and the switch handle 9 held in the "on" position, the door 4 of the refrigerator may be closed and the motor 5 then started simply by operating the control-switch 11. As the motor turns, the dasher of the mixing vessel 6 will be rotated and the food thereby churned. The consistency of the food increases and its temperature falls as the churning operation continues. Naturally the time required for the churning operation will depend largely upon the rate at which the food temperature falls. As previously stated, this operating period heretofore has been unduly long. This, I have discovered, is due, in a substantial measure, to the counteracting effect of the heat generated by the motor, despite the fact that the motor employed may be very small. I have also discovered that this effect may be largely obviated and the operating period considerably reduced simply by preventing the direct transfer of heat from the motor casing to the walls of the mixing vessel 6 and the freezing compartment 3 through the short paths of high heat conductivity afforded by the direct metal-to-metal contact points normally existing between these parts. Accordingly the paths of high conductivity between the vessel 6 and the motor 5 are interrupted by providing insulating liners 13 in the vertical openings of the positioning lugs 8, while the path between the bottom wall of the freezing compartment 3 and the motor 5 is interrupted by providing the motor with an insulating base 14. This is a very desirable feature because it renders unnecessary the removal of the motor 4 from the freezing compartment, thus preserving the compactness of the unit and retaining the motor in a position where it may be conveniently supported upon the bottom wall of the compartment.

In order to augment the effect of the insulation, I propose to ventilate the motor by drawing air into its casing through side wall inlet openings 15 and forcing the air through the motor chamber to end wall outlet openings 16 (see Figure 2). The unit preferably is made of such length that when inserted into the freezing compartment of a standard refrigerator, the motor casing will project through the open end of the compartment sufficiently to position some of the inlet openings 15 and all of the outlet openings 16 away from the compartment. By so doing, cool air is taken largely from the main storage chamber of the refrigerator, while heated air is directed downwardly away from the freezing compartment ino the cooling chamber proper of the refrigerator, the temperature of the motor casing being correspondingly held at a lower value. With this arrangement, the operating time necessary to obtain a desired consistency is further reduced over that otherwise required.

When the desired consistency is reached the movement of the dasher should be stopped, not only to preserve the proper consistency, but to prevent further increase in the load carried by the motor. According to my invention this is accomplished automatically so as to render unnecessary any attention from the operator after the churning operation has once started.

Inasmuch as the time required to produce the proper consistency under similar conditions of use should not vary to any great extent, the operation of the stopping means may, if desired, be controlled by a timing device. I prefer, however, to condition the operation of such means upon the consistency of the food as measured by the load placed on the motor when such consistency is reached. Various structures may, of course, be utilized to accomplish this result, one structure being shown in Figures 1 to 9.

In this embodiment the stopping means are made a part of the driving connection between the motor and dasher shafts 5—a and 6—a respectively. As shown, the driving connection includes a somewhat bell-shaped casing 17 (see Figures 6 and 8), the narrow end of which fits over and is secured to the driving shaft 5—a of the motor so as to rotate therewith. The open end of the casing 17 is covered by a plate 18 which is loosely mounted on the shaft 5—a and held thereon by a screw 19 secured to the end of the shaft. The outer face of the plate 18 is provided with a pair of diametrically opposed studs 20 which, when the parts are in driving relation, straddle a cross-bar 21 fixedly mounted on the dasher shaft 6—a and thereby drive the dasher when the plate 18 is rotated. The connection thus provided permits the motor and dasher to be connected to and disconnected from each other simply by making or breaking the connection accorded between these parts by the spacing arm 7 and the lugs 8.

Now, in order to rotate the plate 18 its inner face is provided with a raised surface or cam 22 which is resiliently connected to and driven by the casing 17, through its engagement with the cam-shaped or inner end of a radially movable tripping or torque transmitting element 23, this element being carried by the casing 17. The tripping element 23 is arranged within the casing 17 between a pair of inwardly extending arms or lugs 24 which form a radial guide-way leading inward toward the center of the casing 17 from an opening in its periphery. The element 23 is provided with a central, radially-extending slot and is continuously and resiliently urged inwardly along the guide-way toward the drive-shaft 5—a by a spring 25 which is positioned in said slot between the innermost wall thereof and a stationary lug 26, the latter projecting into the slot from a wall of the casing 17.

It will now be evident that as the motor rotates, the element 23 will move in a circular path about the axis of the rotating drive-shaft 5—a and, during such movement, will resiliently engage the cam 22 and thereby rotate plate 18, which in turn will drive the dasher through the engagement of its studs 20 and the dasher bar 21. As the consistency of the food increases, the torque or load of the motor will increase with a consequent increase in the contact pressure between the cam surfaces of element 23 and plate 10. As this contact pressure increases, the element 23 will be moved radially outward against the action of spring 25 ultimately projecting through the opening at the end of the guide-way. The spring 25 is designed to permit the element 23 to project through this opening a predetermined distance when the desired consistency of the food is reached, at which point the element 23 operates to trip the switch-handle 9 to the "off" position.

Accordingly a bell-crank lever is pivotally mounted on the end wall of the motor casing as indicated at 27, with one arm 28 extending along the motor casing and terminating in a lateral extension 29 which projects directly into the path of radial movement of the element 23. The other arm 30 of this lever extends toward the switch-handle 9 and terminates in a hook 31. The bell crank may be rocked about its pivot 27 from one position in which the hook 31 engages over and holds the motor switch handle 9 in the "on" position, to another position in which handle 9 is released and thereby permitted to return to the "off" position. The crank is resiliently urged toward the switch-engaging position by a spring 32, one end of which is secured to the motor casing. Now, as the element 23 projects through the opening in casing 17 it engages the extension 29 of the bell-crank arm 28. Further movement of the element 23 causes a corresponding rocking movement of the bell-crank around pivot 27. When the desired consistency has been reached, the movement of the bell-crank will be such as to cause the bell-crank arm to swing around the pivot 27 to a position in which the hook 31 releases the switch-handle 9 thus stopping the motor. The light alarm 12 will now be energized to indicate that the churning operation has ended. It may be deenergized simply by pushing the switch 11 to the "off" position. The mixture, now being of the proper consistency, may be removed from the freezing compartment of the refrigerator when desired.

It may be noted at this time that the path provided between the motor and mixing vessel by the driving connection when composed entirely of metal, does not seem to have any material effect on the operating time. This apparently is due to the fact that such path is not only long but includes a number of point and surface contacts, all of which serve to increase its resistance to the flow of heat. Consequently, it will not ordinarily be necessary to provide this path with heat insulation.

In the alternative construction shown in Figures 10 and 11 the connecting or spacing arm 7 between the motor and mixing vessel are fixedly secured at one end to the vessel and arranged for insertion into suitable openings in the motor casing, these openings being provided with insulating liners 13 to prevent the direct transfer of heat. The bars are held in the inserted position by a lever 33 which extends into a suitable slot in the adjacent arm 7, this lever being pivotally mounted for movement to a releasing position when desired. This type of connecting arm is desirable because it not only permits the motor and vessel to be connected by a movement which is directly in line with its driving connection, but it also provides the mixing vessel with a form of handle by which it may be conveniently carried.

In this embodiment, means are also provided for varying the tension of the tripping element 23 so as to permit a regulation of the operating period or a variation in the consistency of the food produced by the machine. Such means include a regulating screw 34 projecting inwardly through the periphery of the casing 17 at a point directly opposite the tripping element. The screw is threaded to a cross-bar 35 which extends within and at one side of the casing in parallel relation to a cross-bar 36 passing through the tripping element 23 on the opposite side of the casing. The opposite ends of bar 35 are resiliently connected to the corresponding ends of bar 36 and springs 37. Now, it will be apparent that by turning the screw 34 to increase or decrease the tension on the springs 37, the torque required to effect a tripping movement of the element 23 will be accordingly increased or descreased and the machine thereby conditioned to produce a greater or lesser consistency in the food being churned.

In Figure 12 an alternative arrangement for stopping the motor at the end of the operating period is schematically shown. This arrangement consists of a thermostat 38 which is placed directly in the electrical circuit of the driving motor 5. As the consistency of the food being churned increases, the torque necessary for the churning operation also increases with a consequent increase in the current passing through the motor. As this current passes through the thermostat 38, its free end bends toward the right to a degree proportional upon the amount of current passing through the thermostat. When the desired consistency is reached, the adjustment of the thermostat will be such that its movement to the right at that time is sufficient to release or unlatch the part 39 which is then pulled to a circuit-breaking position by the spring 40. With the circuit broken, the thermostat returns to its original position. When it is desired to again start the motor, it is only necessary to push the part 39 into latching position, a handle 41 being provided for this purpose.

In Figure 13 another alternative arrangement for controlling the operating period is shown schematically. This arrangement merely consists of some suitable timing arrangement 42 which may be of any desired construction arranged to effect an opening in the motor circuit at the end of the operating period to which the timing element is set.

Having described my invention, I claim:

1. In a food churning device of the class described, the combination with a churning vessel having a dasher and adapted for insertion into the freezing compartment of a mechanical refrigerator, of a motor arranged adjacent to said vessel in driving relation with said dasher, and connecting means securing the motor to the vessel, said means including portions of low heat conductivity which substantially limit the direct transfer of heat from the motor to the vessel.

2. A food churning device of the class described comprising a churning vessel having a dasher, a motor arranged adjacent to said vessel in driving relation with said dasher and connecting means securing the motor to the vessel, said connecting means affording paths of low heat conductivity which substantially limit the direct transfer of heat from the motor to the vessel, said vessel and motor being adapted for insertion as a unit into the freezing compartment of a mechanical refrigerator.

3. A food churning device of the class described comprising a churning vessel having a dasher, a motor arranged adjacent to said vessel in driving relation with said dasher and connecting means securing the motor and the vessel together as a unit which is adapted for insertion into the freezing compartment of a mechanical refrigerator, said connecting means including insulated portions of low heat conductivity which substantially limit the direct transfer of heat from the motor to the vessel.

4. A food churning device of the class described comprising a churning vessel having a dasher, a motor arranged adjacent to said vessel in driving relation with said dasher, connecting means securing the motor and vessel together as a unit which is insertible into the freezing compartment of a mechanical refrigerator and means for supporting the motor upon the walls of a freezing compartment when the unit is inserted therein, said supporting means providing paths of low heat conductivity which substantially limit the direct transfer of heat from the motor to the supporting wall.

JOHN B. McFERRAN, Jr.